United States Patent [19]
Busch

[11] 3,856,537
[45] Dec. 24, 1974

[54] BORON-SILICON COMPOSITION AND METHOD OF MAKING SAME
[75] Inventor: Raymond A. Busch, Richland, Wash.
[73] Assignee: Battelle Development Corporation, Columbus, Ohio
[22] Filed: Mar. 7, 1973
[21] Appl. No.: 338,902

[52] U.S. Cl. .................................................. 106/55
[51] Int. Cl............................................. C04b 35/58
[58] Field of Search ............ 106/55, 73.5; 423/289, 423/344

[56] References Cited
UNITED STATES PATENTS
3,108,886   10/1963   Adamsky et al...................... 106/55

Primary Examiner—J. Poer
Attorney, Agent, or Firm—Klarquist, Sparkman, Campbell, Leigh, Hall and Whinston

[57] ABSTRACT

Boron and silicon are sputtered onto a substrate to form a metastable structure having hardness values exceeding those of known composition. The invention herein described was made in the course of or under a contract with the Advanced Research Projects Agency.

2 Claims, 1 Drawing Figure

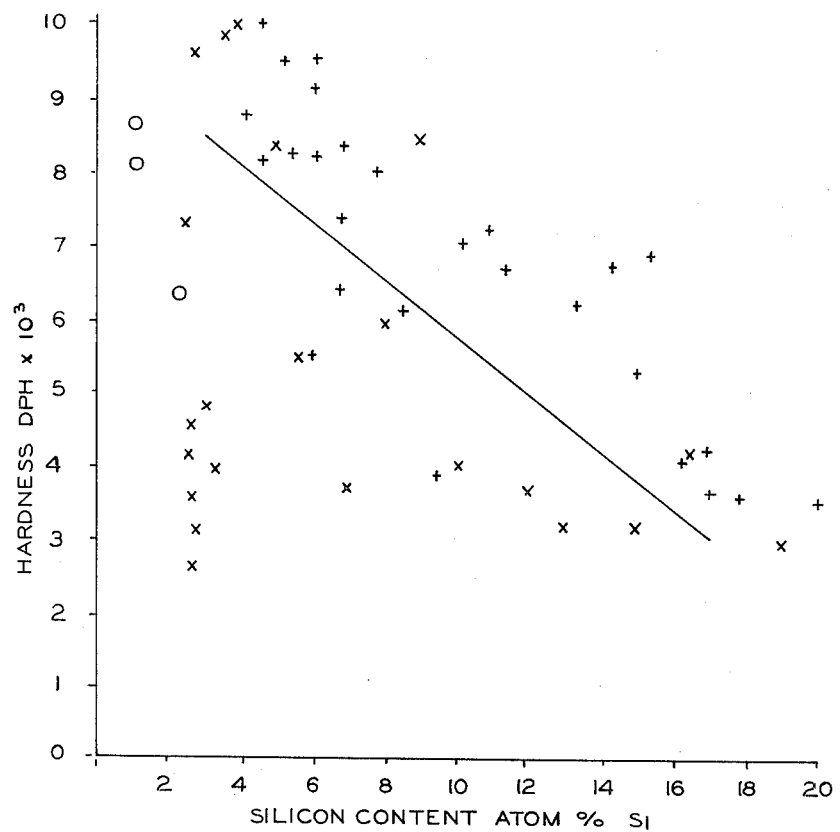

BORON-SILICON COMPOSITION AND METHOD OF MAKING SAME

BACKGROUND OF INVENTION

It has been known heretofore that boron and silicon can be combined to form hard refractory materials. For example, U.S. Pat. No. 3,108,886 discusses boron and silicon compositions, some including carbon, that are formed by fusion and exhibit high hardness.

SUMMARY OF THE INVENTION

The present invention relates to new and novel boron-silicon compositions having hardness values greatly exceeding many of those known heretofore, including compositions of the nature disclosed in U.S. Pat. No. 3,108,886. The novel compositions of the present invention are formed by simultaneously sputtering boron and silicon onto a supporting substrate. The resulting compositions exhibit exceptional hardness values of the order of 8,000–10,000 DPH for compositions having one to six atom percent silicon to about 4,000 DPH for compositions having 17 atom percent silicon, the hardness value decreasing more or less proportionately as the silicon content increases. (All DPH values herein are for 200 gram loads unless otherwise noted.)

DRAWING

The drawing comprises a plot of hardness versus silicon content for compositions made in accordance with the invention.

DETAILED DESCRIPTION OF THE INVENTION

To form the compositions of the invention any suitable sputtering method can be employed, such as the triode sputtering method described in the article "Low-Energy Sputtering," J. W. Nickerson and R. Moseson, Research/Development, March 1965 (pp. 52–56).

In accordance with a preferred procedure, a cathode or target is formed of a mixture of powdered silicon and boron in the approximate composition desired in the deposit. This mixture is cold pressed with a volatile binder and then baked to remove the binder. The green compact is then sintered in vacuum at a high temperature. Thereafter the compact is positioned in suitable sputtering apparatus and a deposit formed utilizing a deposition technique such as referred to above. In place of mixed powder compacts, an array of strips or other shapes may be used to form the cathode. In a typical procedure, a cathode having a diameter of 3.8 cm. was formed and deposition made on a substrate having a diameter of 2.5 cm. positioned 1.7 cm. from the cathode. Deposition was carried out in an argon atmosphere at a pressure of between 2.0 and 2.5 $\times$ 10$^{-3}$ torr. The plasma was formed at 32 volts and 16 amps. DC, the cathode being at minus 1,500 volts and 0.2 amps. DC. Before its deposition the substrate formed of steel and hardened to RC 58–60 was cleaned by ion etching at −100 volts, 0.03 amps. DC for 10 minutes.

The substrate is maintained at between 50°–70° centigrade, inasmuch as higher temperatures result in decreased hardness in the deposit. The material of the substrate is not critical and may, for example, be of a ceramic.

X-ray diffraction studies of deposits made in accordance with the invention indicate a metastable phase that can not be correlated with any known structure. The only line which appears from the as deposited material is at 2.64 A. Heat treatment of 500° centigrade for one hour causes a many line diffraction pattern to be obtained and the hardness of the deposit also undergoes a substantial decrease. The diffraction pattern and hardness after the 500° centigrade heat treatment were similar to those observed in an electron beam melted sample of the same composition.

The hardness of the material of the invention is illustrated in the attached graph which is a plot of hardness against the silicon content of the composition being measured. Two series of hardness measurements were made on graded deposits, that is on deposits formed as described in Example III, below. The hardness was determined at various points on the deposit formed on the targets, the composition at the point of hardness measurement being obtained by use of an electron microprobe. The symbol X is used to represent the points for one of these series, the symbol + for the other series.

Hardness readings were also taken on deposits of uniform composition formed by the manner described in Examples I and II. Two deposits contained one percent silicon and another 2.2 percent. Six hardness readings were taken on each deposit. The average of the hardness values is shown on the graph by small circles. The line drawn on the graph shows the approximate change of hardness as the silicon content increases. The cluster of low hardness values around 2.5 atom percent silicon is believed to be unrepresentative and to have resulted from deposits too thin to give valid measurements.

There is some indication that the hardness of the composition reaches a maximum between about three to six percent silicon content. However, the difficulty of securing accurate hardness measurements and the inability to secure further verifying readings at this time renders this somewhat inconclusive. Nonetheless, the hardness determinations which have been made show conclusively the extreme hardness of the compositions of the invention.

The invention will be more completely illustrated in the following specific examples:

EXAMPLE I

An uniform mixture containing 97.8 atomic percent boron and 2.2 atomic percent silicon was cold pressed with a zinc stearate binder to form a disc 3.5 cm. in diameter. The binder was thereafter removed by baking at 300 degrees centigrade and the compact sintered in vacuum at 1,100° for 20 hours. The cathode so formed was placed in an ion sputtering apparatus with the substrate spaced 1.7 cm. from the cathode. The atmosphere within the chamber was replaced with argon and maintained at a pressure of between 2.0 and 2.5 $\times$ 10$^{-3}$ torr. The substrate was a steel disc 2.5 cm. in diameter hardened to RC 58–60. Before deposition the substrate was cleaned by ion etching at −100 volts, 0.03 amps. DC for ten minutes. A plasma voltage of 32 volts was maintained at 16 amps. DC with the cathode at −1,500 volts and 0.2 amps. DC. Deposition was continued for 10 hours to form a deposit of 1 mil thickness while maintaining the substrate at 70° centigrade. The resulting composition was 2.2 atomic percent silicon and had a hardness of 6325 DPH (100-gram load).

EXAMPLE II

In another experiment a uniform mixture of boron and silicon containing one atom percent silicon was sputtered under similar conditions. The resulting deposit had an average hardness of 8,000 DPH (200-gram load).

EXAMPLE III

A cathode was formed in a circular configuration comprising a segment of silicon consisting of about 10 percent of the target area and the balance being boron. Such target was sputtered onto a substrate under conditions similar to those on Example I to form a boron-silicon deposit which graded in percentage of boron-silicon composition from one side to the other. Hardness measurements were taken of the composition from about 20 atom percent silicon to about 4 atom percent silicon. The hardness increased as the silicon content decreased from a hardness of about 3,500 DPH (100g) to about 9,000 DPH (100g).

The deposits obtained by the sputtering are black and have a smooth highly reflective surface with an appearance similar to that of silicon carbide. Microscopic surface relief suggests a grain diameter of less than a micron.

The sputtering procedure enables the production of boron-silicon compositions not heretofore known, but, moreover, enables the production of boron-silicon deposits that substantially exceed in hardness, similar compositions made by other known techniques such as by sintering.

The compositions of the invention may be used for bearings or for other parts subjected to wear.

I claim:

1. A metastable boron-silicon composition containing up to about 20 atom percent silicon and the balance boron, having a hardness of at least about 3,500 DPH.

2. A composition in accordance with claim 1 comprising between about three to six atom percent silicon and the balance boron.

* * * * *